United States Patent [19]

Jackson et al.

[11] Patent Number: 4,732,958
[45] Date of Patent: Mar. 22, 1988

[54] EPOXY FUSION PROCESS

[75] Inventors: Roy J. Jackson; Larry S. Corley, both of Houston, Tex.

[73] Assignee: Shell Oil Company, Houston, Tex.

[21] Appl. No.: 947,723

[22] Filed: Dec. 30, 1986

[51] Int. Cl.$^4$ .................... C08G 59/62; C08G 59/02
[52] U.S. Cl. .................................... 528/89; 528/365; 528/374
[58] Field of Search ................... 528/89, 365, 374

[56] References Cited

U.S. PATENT DOCUMENTS

| | | | |
|---|---|---|---|
| 3,477,990 | 11/1969 | Dante et al. | 260/47 |
| 3,547,881 | 12/1970 | Mueller et al. | 260/47 |
| 3,547,885 | 12/1970 | Dante et al. | 260/47 |
| 3,824,212 | 7/1974 | Sinnema et al. | 260/47 EP |
| 3,948,855 | 4/1976 | Perry | 260/47 EP |
| 3,978,027 | 8/1976 | Marshall | 260/47 EP |
| 4,048,141 | 9/1977 | Doorakian et al. | 260/47 EC |
| 4,132,706 | 1/1979 | Doorakian et al. | 528/89 |
| 4,320,222 | 3/1982 | Lopez | 528/89 |
| 4,352,918 | 10/1982 | Whiteside, Jr. et al. | 528/89 |
| 4,389,520 | 6/1983 | Gannon | 528/89 |
| 4,438,254 | 3/1984 | Doorakian et al. | 528/89 |
| 4,634,757 | 1/1987 | Marshall | 528/89 |

OTHER PUBLICATIONS

Acta Chem. Scand., 31, 645–650 (1977).
Inorganic Synthesis, 15, 84–90 (1974).

Primary Examiner—Earl Nielsen

[57] ABSTRACT

According to the invention, a relatively low molecular weight epoxy resin is reacted with a hydroxyl group-containing compound in the presence of a bis(trihydrocarbyl phosphine)iminium salt catalyst to produce a high molecular weight fusion reaction product. The process is particularly useful in reacting an epoxy resin having a molecular weight of less than about 500 with bisphenol-A in the presence of a bis(phosphine)iminium halide to produce a fusion reaction product having a molecular weight within the range of about 500 to 7000. The catalyst is relatively water-insensitive, and the reaction can therefore be carried out in the presence of water.

18 Claims, No Drawings

EPOXY FUSION PROCESS

BACKGROUND OF THE INVENTION

This invention relates to the preparation of epoxy resins. In a specific aspect, the invention relates to a process for reacting, in an epoxy "advancement" or "fusion" reaction, a phenolic compound with a low molecular weight epoxy resin to prepare a high molecular weight fusion product. In a further specific aspect, the invention relates to a catalyst useful for such an advancement reaction.

It is known to prepare epoxy resins by reacting a compound having a vicinal epoxide group, such as epichlorohydrin, with bisphenol-A in the presence of sodium hydroxide. To prepare linear, high molecular weight epoxy resins, it is common practice to first prepare an epoxy resin having a relatively low weight per epoxide (WPE) and then to react it, in the presence of a catalytic amount of a suitable catalyst, with a compound containing phenolic hydroxyl groups. Various catalysts have been employed in such fusion reactions, including phosphonium salts such as those disclosed in U.S. Pat. No. 3,447,990 and U.S. Pat. No. 4,438,254, both of which disclose various classes of phosphonium salt fusion catalysts.

Such phosphonium halide catalysts are highly active in promoting the epoxy fusion reaction to produce a high molecular weight epoxy resin. It is often desirable to prepare "precatalyzed" mixtures of the epoxy resin and the fusion catalyst which have good storage stability even at elevated temperatures. The use of some phosphonium halide catalysts results in a precatalyzed system which is inactive after storage, particularly under elevated temperatures. Some phosphonium halide catalysts, as discussed in U.S. Pat. No. 4,438,254, are very water-sensitive, necessitating the careful control of water in the advancement reaction mixture.

It is therefore an object of the invention to provide new fusion catalysts which are highly active in the fusion reaction but which can be included in a precatalyzed epoxy composition having good storage stability and low sensitivity to moisture.

SUMMARY OF THE INVENTION

According to the invention, a composition is provided comprising an epoxy resin and a bis(trihydrocarbyl phosphine)iminium salt. Further according to the invention, a relatively low molecular weight epoxy resin is reacted with a hydroxyl group-containing compound in the presence of a bis(trihydrocarbyl phosphine)iminium salt catalyst to prepare a higher molecular weight fusion product.

DETAILED DESCRIPTION OF THE INVENTION

The epoxy resin fusion catalyst of the invention can be described by the formula

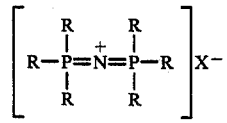

in which each R is selected independently from a substituted or unsubstituted hydrocarbyl group and X is a compatible anion.

The R groups can be aliphatic or aromatic. The aliphatic R groups will generally fall within the class of $C_1$–$C_{10}$ alkyl. Preferably, at least one R group per phosphorus atom is aromatic. The preferred epoxy fusion reaction catalysts, because of their commercial availability and demonstrated catalytic effectiveness, are bis(triphenylphosphine)iminium salts.

The compatible anion X can be selected from a wide range of chemical species. Preferred anions are halides, preferably bromide, chloride or iodide; carboxylates, such as formate, acetate, oxalate or trifluoroacetate; conjugate bases of weak inorganic acids, such as bicarbonate, fluoride or dihydrogen phosphate, and conjugate bases of a phenol, such as phenate or an anion derived from bisphenol-A. The most preferred anions are halides, with chloride being the most preferred halide. Pure bis(triphenylphosphine)iminium chloride is available commercially from Alfa Chemicals. The preparation of such salts is known in the art. For example, bis(phosphine)iminium chlorides can be prepared by the reaction of a tris(hydrocarbyl)phosphine dichloride with hydroxylamine hydrochloride and the corresponding tris(hydrocarbyl) phosphine. This preparation is described for bis(triphenylphosphine)iminium chloride in *Inorganic Synthesis*, vol. 15, pp. 84–87 (1974).

The above-described bis(phosphine)iminium salts are useful as catalysts of reactions of compounds having a vicinal epoxy group with acidic compounds such as phenols, thiophenols and carboxylic acids, for example. An example of such a reaction is an epoxy fusion process in which a low molecular weight epoxy resin is reacted with an acidic fusion compound such as a phenol, thiophenol or carboxylic acid, to produce a high molecular weight fusion product. The low molecular weight epoxy resin starting material will preferably be a liquid polyepoxide having an average of more than 1 vicinal epoxy group per molecule and a weight per epoxide of less than about 500, usually less than about 300. Preferred polyepoxides include liquid glycidyl polyethers of polyhydric phenols and polyhydric alcohols. Most preferred are the glycidyl polyethers of 2,2-bis(4-hydroxyphenyl)propane having an average molecular weight between about 340 and about 900 and an epoxide equivalent weight (ASTM D-1652) of between about 170 and about 500. Such liquid epoxy resins are available commercially as, for example, EPON ® Resin 828, a liquid epoxy resin having a molecular weight of about 376 and a weight per epoxide of about 185–192.

The low molecular weight epoxide is reacted with a hydroxyl group-containing compound such as a phenol, thiophenol or carboxylic acid. The preferred fusion compounds are phenols having at least one hydroxyl group attached to an aromatic nucleus. The phenols can be monohydric or polyhydric and can be substituted or unsubstituted. Examples of suitable phenols include phenol, resorcinol, o-cresol, m-cresol, p-cresol, chlorophenol, nitrophenol, hydroquinone, 2,2-bis(4-hydroxyphenyl)propane, 2,2-bis(4-hydroxyphenyl)pentane and the like, and polymeric polyhydric phenols obtained by condensing monohydric or polyhydric phenols with formaldehyde.

Preferred phenols are polyhydric phenols containing from 2 to 6 hydroxyl groups and up to about 30 carbon atoms, including those represented by the formula

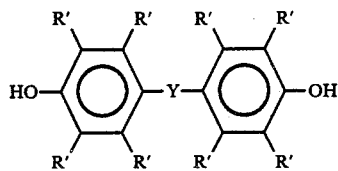

wherein Y is a polyvalent radical and each R' is independently selected from hydrogen, halogen and hydrocarbyl. The preferred radicals represented by Y are oxygen, sulfur, divalent hydrocarbon radicals containing up to about 10 carbon atoms, and oxygen-, silicon-, sulfur-, phosphorus- and nitrogen-containing hydrocarbon radicals. The preferred phenol is 2,2-bis(4-hydroxyphenyl)propane (bisphenol-A), in which each R' is H and Y is isopropylidene.

The amount of the bis(phosphine)iminium salt catalyst used in an epoxy fusion reaction can vary over a wide range, but the catalyst will generally be present in the fusion reaction mixture in an amount of from about 0.001 to about 8 weight percent, preferably about 0.01 to about 2 weight percent based on the weight of the reactants.

The fusion reaction may be carried out in the presence or absence of solvents or diluents. Generally, the reactants will be liquid and the reaction can be carried on without the addition of solvents or diluents. If it is considered desirable to carry out the reaction in a diluent, an inert hydrocarbon such as xylene, toluene or cyclohexane will generally be chosen.

The fusion reaction is generally carried out by combining the polyepoxide and fusion compound reactants at a starting temperature of about 100°–120° C. and allowing the reaction to exotherm to a temperature of about 160°–200° C., for a time of about 1–2 hours. The relative amount of the reactants depends upon the characteristics, particularly the molecular weight, of the product desired. For the preferred high molecular weight phenolic hydroxy ether resin products having an epoxide equivalent weight of between about 500 and about 7,000, about 0.4 to 1 mole bisphenol-A will be reacted with each mole of a liquid diglycidyl ether of bisphenol-A.

The fusion reaction can be carried out in the presence or absence of water, depending upon the sensitivity to water of the particular bis(phosphine)iminium salt catalyst employed and the fusion product desired. Satisfactory product will generally be obtained even when 0.01 weight percent or more water is present in the reaction mixture. An amount of water of 0.3 to 1.0 weight percent is not unusual in the starting polyepoxide, and the reaction is most conveniently carred out without removal of this water.

When the fusion reaction has proceeded to an advanced epoxy resin fusion product having the desired WPE, generally about 500 or greater, deactivation of the catalyst is conveniently carried out by adding, with stirring, the desired amount of an acid or sulfonium salt of an acid containing an anion of low nucleophilicity (HBF$_4$, CF$_3$SO$_3$H, HPF$_6$ and HSbF$_6$, for example) to the fusion reaction mixture. The temperature at which deactivation is carried out is not critical, and will generally occur at the temperature of the fusion reaction mixture at the desired point of termination of the fusion reaction, which will generally be about 180° C. Following deactivation of the catalyst, the advanced epoxy resin is recovered and processed by conventional methods.

It will often be advantageous not to deactivate the catalyst, but rather to maintain the phosphonium iminium catalyst in the recovered fusion product in an active state. This enables the use of the residual live phosphonium iminium salt to catalyze subsequent chemical processes which employ the fusion product as a starting material. For example, the high molecular weight fusion product containing live catalyst can be esterified with a dimer acid, without additional esterification catalyst, to produce a surface coating resin. The use of advanced epoxy resins made employing catalysts which are essentially deactivated during the advancement reaction requires either the addition of an esterification catalyst or a base, such as sodium carbonate, to prevent gelation before a satisfactory low acid number is achieved in the esterified epoxy resin.

The invention pre-catalyzed composition has long shelf life and good stability in the presence of water. The high molecular weight fusion product is obtained with minimum branching and is useful for solvent-borne coatings, powder coatings or electrical laminating.

EXAMPLE

This example reports the results of tests to determine the storage stability of the invention precatalyzed resin system. Precatalyzed resin samples were prepared from a liquid polyepoxide having a weight per epoxide of about 185 (EPON ® Resin 828, available from Shell Chemical Company) and a phosphonium catalyst present in a concentration of 0.25 meq/100 g resin. Storage times for the precatalyzed resins are shown in Table 1.

After the indicated storage time, a small-scale fusion reaction was carried out to assess the retention of activity of the stored precatalyzed resin. About 10 g precatalyzed resin was mixed with sufficient bisphenol-A, the starting phenolic compound, to give a product having a WPE of about 500 at 100% BPA conversion and an assumed starting WPE of 185. The reaction mixtures were held at 160° C. for about 45 minutes. No effort to remove water from the reaction mixture was made. The results, in terms of product WPE, are shown in Table 1.

TABLE 1

| Storage Stability of Precatalyzed Resins at 200° F. | | | |
|---|---|---|---|
| Storage Time (days) | WPE[1] | WPE[2] | Target WPE |
| 0 | 497 | 486 | 478 |
| 3 |  | 477 |  |
| 4 | 516 |  |  |
| 7 | 554 | 298 |  |
| 11 | 628 | * | 610[3] |
| 18 | 670 | * |  |
| 34 | 802 | * | 741[3] |

*Catalyst essentially inactive.
[1]Weight per epoxide of fusion resin prepared using bis(triphenylphosphine iminium) chloride catalyst.
[2]Weight per epoxide of fusion resin prepared using ethyltriphenyl phosphonium iodide catalyst.
[3]Theoretical recalculation based upon WPE of the aged resin (see TABLE 2).

WPE's of the aged epoxy resin of the precatalyzed system containing bis(triphenylphosphine iminium) chloride are shown at various storage times in Table 2.

TABLE 2

| Storage Stability of Precatalyzed Resin | |
|---|---|
| Times (days) | WPE |
| 0 | 187 |
| 11 | 210 |
| 34 | 220 |

A phosphorus NMR of the precatalyzed samples containing bis(triphenylphosphine iminium) chloride aged for 34 days at 220° F. was unchanged from that of the unaged sample, further indicating the storage stability of the iminium catalyst.

We claim:

1. A process for preparing an advanced epoxy resin, the process comprising:
   contacting in a reaction mixture a polyepoxide having an average of more than 1 vicinal epoxide group per molecule and a weight per epoxide less than about 500 with a hydroxyl group-containing compound in the presence of a catalytic amount of an iminium catalyst of the formula

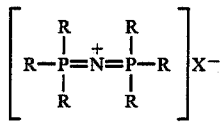

in which each R is selected independently from substituted or unsubstituted hydrocarbyl and X is a compatible anion, at a temperature in the range of about 100° C. to about 200° C. for a time sufficient to produce an advanced epoxy resin having a weight per epoxide of at least about 500.

2. The process of claim 1 in which at least one R on each phosphorus atom is phenyl.

3. The process of claim 1 in which X is halide.

4. The process of claim 1 in which the catalyst is bis(triphenylphosphine)iminium chloride.

5. The process of claim 1 in which the amount of catalyst employed is between about 0.001 and about 1.0% by weight based on the weight of the polyepoxide.

6. The process of claim 1 wherein the polyepoxide is a diglycidyl ether of 2,2-bis(4-hydroxyphenyl)propane.

7. The process of claim 1 in which the hydroxyl group-containing compound is selected from the group consisting of phenols, thiophenols and carboxylic acids.

8. The process of claim 1 in which the hydroxyl group-containing compound is bisphenol-A.

9. The process of claim 8 in which the catalyst is bis(triphenylphosphine)iminium halide present in the reaction mixture in an amount of from about 0.001 to about 1.0% by weight, based on the weight of the polyepoxide.

10. The process of claim 1 in which the reaction mixture further comprises at least about 0.01 weight percent water, based on the mixture of the polyepoxide.

11. A process comprising
    recovering from a process according to claim 1 a reaction product comprising the advanced epoxy resin and at least a portion of the iminium catalyst, and
    reacting the recovered advanced epoxy resin with a dimer acid in the presence of the recovered iminium catalyst to produce an esterified epoxy resin.

12. The process of claim 11 in which the recovered iminium catalyst is a bis(triphenylphosphine)iminium halide.

13. The process of claim 11 which is carried out in the absence of a base.

14. A composition comprising:
    (a) a polyepoxide, and
    (b) at least about 0.001 weight percent of an iminium compound of the formula

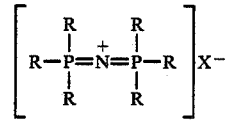

in which each R is selected independently from substituted and unsubstituted hydrocarbyl and X is a compatible anion.

15. A composition according to claim 7 in which at least one R on each phosphorus atom is phenyl.

16. The composition of claim 7 in which component (b) is a bis(triphenylphosphine)iminium halide.

17. The composition of claim 13 in which the bis(triphenylphosphine)iminium halide is present in an amount within the range of about 0.001 to about 1.0% by weight, based on the weight of the polyepoxide.

18. The composition of claim 14 further comprising from about 0.03 to about 1.0% by weight water, based on the weight of the polyepoxide.

* * * * *